US011631026B2

(12) United States Patent
Schatz et al.

(10) Patent No.: US 11,631,026 B2
(45) Date of Patent: Apr. 18, 2023

(54) SYSTEMS AND METHODS FOR NEURAL EMBEDDING TRANSLATION

(71) Applicant: META PLATFORMS, INC., Menlo Park, CA (US)

(72) Inventors: Martin Schatz, Seattle, WA (US); Bradley Ray Green, Snohomish, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 1047 days.

(21) Appl. No.: 15/649,492

(22) Filed: Jul. 13, 2017

(65) Prior Publication Data

US 2019/0019105 A1    Jan. 17, 2019

(51) Int. Cl.
*G06N 20/00* (2019.01)
*G06N 5/02* (2006.01)
*G06N 3/08* (2006.01)

(52) U.S. Cl.
CPC ............ *G06N 20/00* (2019.01); *G06N 3/08* (2013.01); *G06N 5/02* (2013.01)

(58) Field of Classification Search
CPC ............ G06N 20/00; G06N 3/08; G06N 5/02
See application file for complete search history.

(56) References Cited

U.S. PATENT DOCUMENTS

| 10,936,947 | B1 * | 3/2021 | Flunkert | G06N 3/0445 |
| 2010/0106704 | A1 * | 4/2010 | Josifovski | G06F 40/58 |
| | | | | 707/708 |
| 2012/0016657 | A1 * | 1/2012 | He | G06F 40/47 |
| | | | | 704/2 |
| 2012/0290399 | A1 * | 11/2012 | England | G06Q 50/01 |
| | | | | 705/14.66 |
| 2016/0124944 | A1 * | 5/2016 | Andreoli | G06F 40/51 |
| | | | | 704/2 |
| 2017/0060855 | A1 * | 3/2017 | Song | G06F 40/55 |
| 2017/0235824 | A1 * | 8/2017 | Liu | G06Q 40/00 |
| | | | | 707/723 |
| 2017/0323203 | A1 * | 11/2017 | Matusov | G06F 16/30 |
| 2018/0011843 | A1 * | 1/2018 | Lee | G06F 40/51 |
| 2018/0052849 | A1 * | 2/2018 | Jagmohan | G06F 40/30 |
| 2018/0203852 | A1 * | 7/2018 | Goyal | G06N 3/006 |

OTHER PUBLICATIONS

Novak, Roman, Michael Auli, and David Grangier. "Iterative refinement for machine translation." arXiv preprint arXiv:1610.06602 (2016). (Year: 2016).*

* cited by examiner

*Primary Examiner* — Li B. Zhen
*Assistant Examiner* — Henry Nguyen
(74) *Attorney, Agent, or Firm* — Sheppard Mullin Richter & Hampton LLP

(57) ABSTRACT

Systems, methods, and non-transitory computer readable media are configured to train a machine learning model. The training can be based on a training set of embeddings of a first type and a training set of embeddings of a second type. The machine learning model can be trained to receive an embedding of a second type and to output a corresponding embedding of the first type. A given embedding of the second type can be provided as input to the machine learning model. An embedding of the first type can be obtained from the machine learning model. The embedding of the first type can correspond to the given embedding of the second type.

20 Claims, 7 Drawing Sheets

500

Train a machine learning model based on a training set of embeddings of a first type and a training set of embeddings of a second type, wherein the machine learning model is trained to receive an embedding of a second type and to output a corresponding embedding of the first type
502

Provide a given embedding of the second type as input to the machine learning model
504

Obtain an embedding of the first type from the machine learning model, wherein the embedding of the first type corresponds to the given embedding of the second type
506

FIGURE 5

SYSTEMS AND METHODS FOR NEURAL EMBEDDING TRANSLATION

FIELD OF THE INVENTION

The present technology relates to the field of machine learning. More particularly, the present technology relates to techniques for neural embedding translation.

BACKGROUND

Users often employ computing devices for a wide variety of purposes. For example, users can use their computing devices to interact with one another, access content, share content, and create content. In some instances, machine learning can be employed to determine content that may be of interest to users. Such content can include images, video, and audio, for example.

SUMMARY

Various embodiments of the present disclosure can include systems, methods, and non-transitory computer readable media configured to train a machine learning model. The training can be based on a training set of embeddings of a first type and a training set of embeddings of a second type. The machine learning model can be trained to receive an embedding of a second type and to output a corresponding embedding of the first type. A given embedding of the second type can be provided as input to the machine learning model. An embedding of the first type can be obtained from the machine learning model. The embedding of the first type can correspond to the given embedding of the second type.

In an embodiment, one or more features which are common to both a first corpus and to a second corpus can be determined. The first type can correspond to the first corpus, and the second type can correspond to the second corpus.

In an embodiment, the machine learning model can be run as its inverse.

In an embodiment, the first type can correspond to a first corpus and the second type can correspond to a second corpus. The second corpus can be a revised version of the first corpus.

In an embodiment, a further machine learning model can be employed in creating the training set of embeddings of the first type. Also, an additional machine learning model can be employed in creating the training set of embeddings of the second type.

In an embodiment, determining the one or more features which are common to both the first corpus and to the second corpus can comprise performing an intersection operation.

In an embodiment, the embedding of the first type can be provided to a second machine learning model. The second machine learning model can have been trained using one or more embeddings of the first type.

In an embodiment, the second machine learning model can provide one or more insights using the embedding of the first type.

In an embodiment, on-the-fly translation can be employed in obtaining the embedding of the first type.

In an embodiment, the embedding of the first type can be stored in a lookup table.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 5 illustrates an example process, according to an embodiment of the present disclosure.

Figure 1:
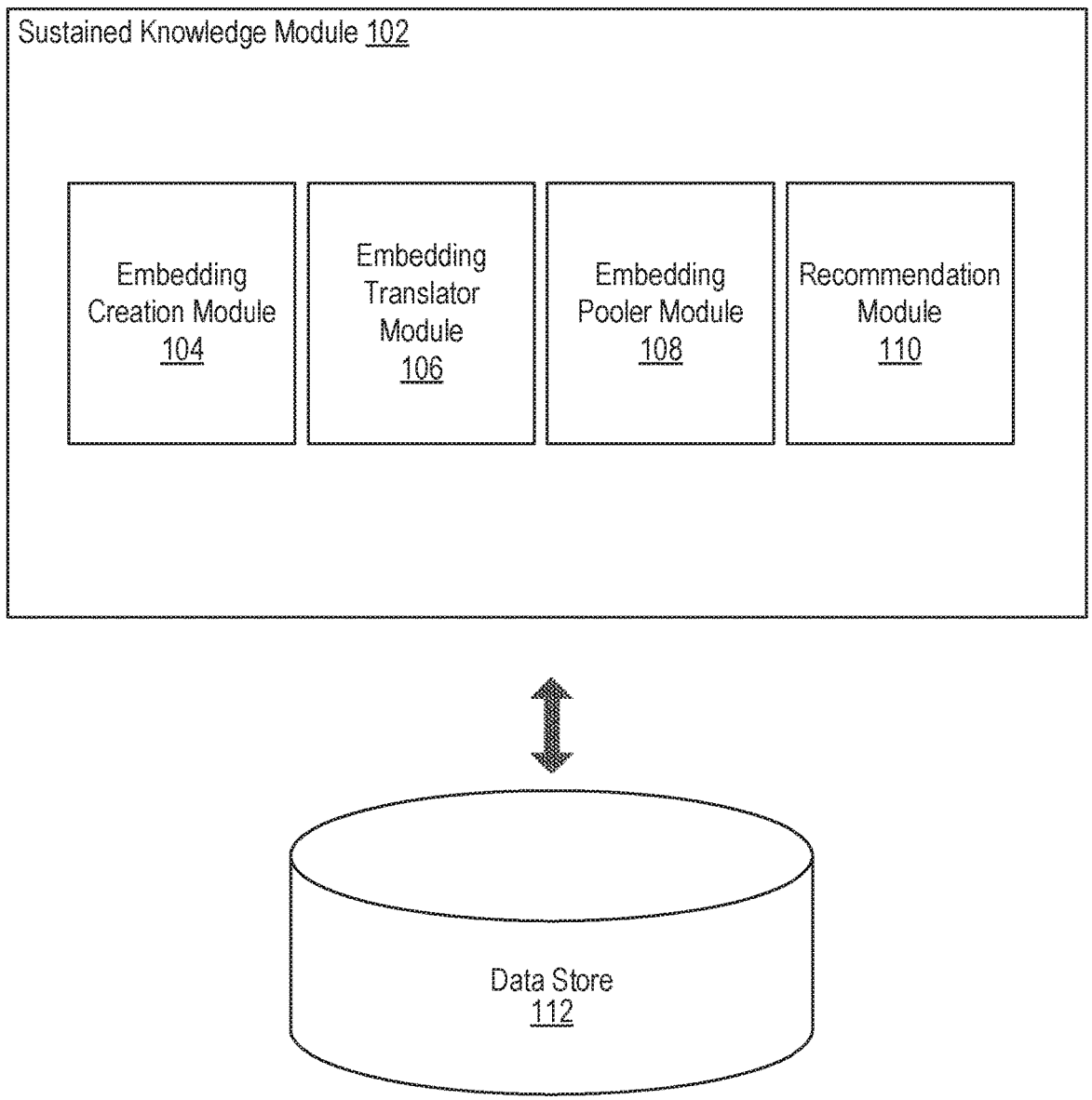
FIG. 1 illustrates an example system including an example sustained knowledge module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Neural Embedding Translation

Users often employ computing devices for a wide variety of purposes. For example, users can use their computing devices to interact with one another, access content, share content, and create content. In some instances, machine learning can be employed to predict content which may be of interest to a user. Such content can include video, audio, pages, user profiles, groups, stories, cities, and status updates, for example.

Under conventional approaches, machine learning models can be trained to generate neural embeddings from various features. These embeddings may be generated periodically in training batches, for example. In general, embeddings can be generated from some corpus of information (e.g., a set of features describing user interactions). As an example, embeddings can be determined using features obtained from a given corpus of features. In many instances, a first set of embeddings generated from the given corpus of features can be different from a second set of embeddings generated from a different corpus of features. As a result, comparisons between embeddings in the first set with embeddings in the second set typically do not provide meaningful insights. For example, an embedding generated for the word "dog" from a given corpus of words may differ from an embedding generated for the word "dog" from a different corpus of words. In this example, the embedding generated from the given corpus of words is an embedding of a first type that is specific to that corpus of words while the embedding generated from the different corpus of words is an embedding of a second type that is specific to the different corpus of words. Here, embeddings of the first type can be compared against one another. Similarly, embeddings of the second type can also be compared against one another. However, embeddings of the first type generally cannot be compared against embeddings of the second type. Therefore, a machine learning model that has been trained using embeddings of the first type can fail or perform poorly if trained further using embeddings of the second type. Similarly, a machine learning model that has been trained with embeddings of the first type can fail or perform poorly if used to predict outputs based on embeddings of the second type. For this reason, a machine learning model trained using a set of embeddings typically must be re-trained when those embeddings are modified. However, re-training such models can be wasteful of time and computing resources. Due to these or other concerns, conventional approaches can be disadvantageous or problematic.

An improved approach rooted in computer technology overcomes the foregoing and other disadvantages associated with conventional approaches specifically arising in the realm of computer technology. In various embodiments, the disclosed technology can translate (e.g., align) different types of embeddings. That is, the disclosed technology can translate one type of embeddings to another type of embeddings. Once translated, these two types of embeddings can be used interchangeably as if they were of the same type. For example, in some embodiments, embeddings of a first type can be produced using features obtained from a corpus. This corpus may then be modified, for example, by adding new features and/or removing existing features. Embeddings of a second type can be produced using features obtained from the modified corpus. One or more features which are common to both corpuses can be identified. For each shared feature, a corresponding embedding of the first type and a corresponding embedding of the second type can be obtained. For example, a first type of embedding for the word "dog" and a second type of embedding for the word "dog" can be obtained. These obtained embeddings can be used to train a machine learning model to translate one type of embeddings (e.g., embeddings of the second type) to another type of embeddings (e.g., embeddings of the first type). More details regarding the disclosed technology are provided herein.

FIG. 1 illustrates an example system 100 including an example sustained knowledge module 102. As shown in the example of FIG. 1, the sustained knowledge module 102 can include an embedding creation module 104, an embedding translator module 106, an embedding pooler module 108, and a recommendation module 110. In some instances, the example system 100 can include at least one data store 112. The components (e.g., modules, elements, etc.) shown in this figure and all figures herein are exemplary only, and other implementations can include additional, fewer, integrated, or different components. Some components may not be shown so as not to obscure relevant details. In some embodiments, the sustained knowledge module 102 can be implemented in a system, such as a social networking system. While the disclosed technology may be described herein in connection with a social networking system for illustrative purposes, the disclosed technology can be implemented in any other type of system or environment.

In some embodiments, the sustained knowledge module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the sustained knowledge module 102 can be implemented, in part or in whole, as software running on one or more computing devices or systems, such as on a user or client computing device. For example, the sustained knowledge module 102 or at least a portion thereof can be implemented using one or more computing devices or systems that include one or more servers, such as network servers or cloud servers. In another example, the sustained knowledge module 102 or at least a portion thereof can be implemented as or within an application (e.g., app), a program, an applet, or an operating system, etc., running on a user computing device or a client computing system, such as a user device 610 of FIG. 6. In some instances, the sustained knowledge module 102 can, in part or in whole, be implemented within or configured to operate in conjunction with a system (or service), such as a social networking system 630 of FIG. 6. A social networking system can include pages that are associated with entities. The pages can be dedicated locations on the social networking system to reflect the presence of the entities on the social networking system. It should be understood that there can be many variations or other possibilities.

The sustained knowledge module 102 can be configured to communicate and/or operate with the at least one data store 112, as shown in the example system 100. The at least one data store 112 can be configured to store and maintain various types of data. For example, the data store 112 can store information describing various corpuses, embeddings, and training data. In some implementations, the at least one data store 112 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 112 can store information associated with users, such as user identifiers, user information, profile information, user specified settings, content produced or posted by users, and various other types of user data.

The embedding creation module 104 can be configured to produce embeddings. In one example, the embedding creation module 104 can access a corpus and produce a respective embedding for some, or all, unique features of the corpus. The produced embeddings can be of a particular type that is specific to the corpus. These embeddings can therefore reflect interrelationships between features of the corpus. Further, since they were produced from the same corpus (or latent space), these embeddings can also be evaluated with respect to one another. In general, embeddings can be produced from various types of features (e.g., words, user interaction data, etc.). For example, a feature can correspond to a page which a user has fanned, a profile which a user has friended, a city which a user has visited, a topic which a user has demonstrated to be of interest, a search result which a user selected, or any combination thereof. It should be understood that there can be many variations or other possibilities. Further details regarding the embedding creation module 104 will be provided below with reference to FIG. 2.

The embedding translator module 106 can be configured to align different types of embeddings. For example, in some embodiments, the embedding translator module 106 can translate embeddings of some type into embeddings of another type. Additional details regarding the embedding translator module 106 will be provided below with reference to FIG. 3.

The embedding pooler module 108 can be configured to produce pooled (or combined) embeddings. In some embodiments, a pooled embedding can be generated from a set of individual embeddings. For example, a pooled (or combined) embedding for a given user may be generated from a set of individual embeddings that represent various features corresponding to the user. In one example, these features may describe various pages that were fanned, or liked, by the user over some period of time. In some embodiments, a pooled embedding for a user can be determined by performing a vector summation operation over a set of individual embeddings. One example equation for determining a pooled embedding is as follows:

$\pi(\text{Person}) = 1/|\Gamma| \cdot \Sigma_{Page \in \Gamma} \pi(\text{Page})$, where $\pi(\text{Page})$ corresponds to an embedding (e.g., an embedding representing some user interaction), $\Gamma$ corresponds to a set of embeddings, $Page \in \Gamma$ in connection with $\Sigma$ indicates a vector summation over all $\pi(\text{Page})$ of the set, $1/|\Gamma|$ corresponds to a weighting by an inverse of a quantity of embeddings of the set, and where $\pi(\text{Person})$ corresponds to the pooled embedding (e.g., a pooled embedding representing a given user).

The recommendation module 110 can be configured to train a machine learning model using a set of embeddings to predict various insights (or recommendations). As one example, the machine learning model can employ a neural network. Once the machine learning model has been trained, the recommendation module 110 can provide one or more embeddings as inputs to the machine learning model. The machine learning model can then output one or more insights (or recommendations) based on an inputted embedding. When training a machine learning model, the recommendation module 110 can also be configured to generate, or obtain, one or more training examples that each specify independent data and dependent data. In some embodiments, the independent data corresponds to a set of inputs and the dependent data corresponds to a set of outputs (e.g., supervisory signal). For example, the independent data can be one or more social networking groups to which a user belongs and the dependent data can be one or more pages on which the user has clicked. In some embodiments, both the independent data and the dependent data can be represented as embeddings. In some embodiments, the embeddings used in conjunction with the recommendation module 110 can be individual embeddings. In other embodiments, the embeddings used in conjunction with the recommendation module 110 can be pooled embeddings.

Figure 2:
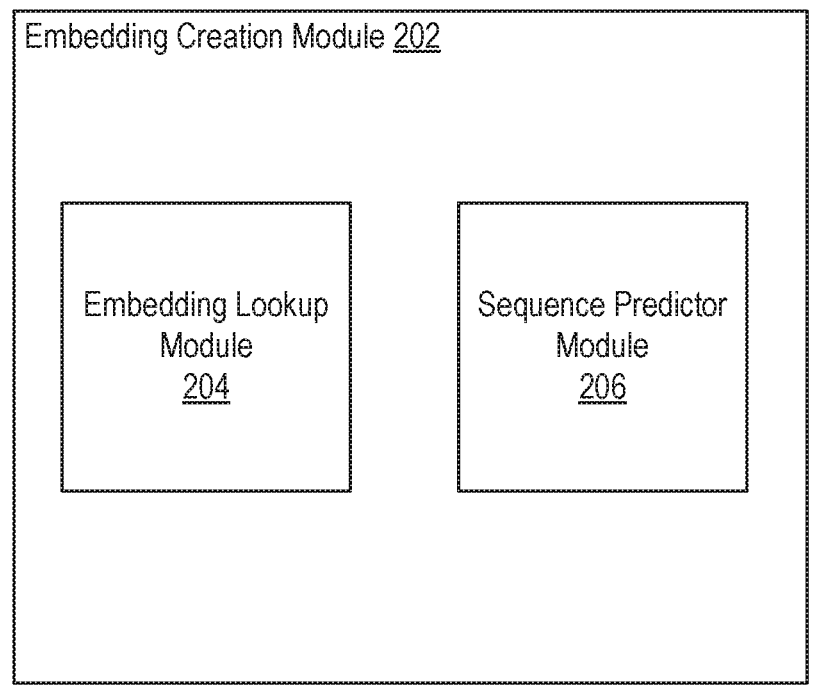
FIG. 2 illustrates an example of an embedding creation module, according to an embodiment of the present disclosure.

FIG. 2 illustrates an example embedding creation module 202, according to an embodiment of the present disclosure. In some embodiments, the embedding creation module 104 of FIG. 1 can be implemented as the example embedding creation module 202. As shown in FIG. 2, the embedding creation module 202 can include an embedding lookup module 204 and a sequence predictor module 206.

The embedding lookup module 204 can be configured to access a corpus of features for which embeddings are to be produced. In some implementations, the embedding lookup module 204 can be further configured to create an embedding for each unique feature of the corpus. In various embodiments, embeddings can be determined using generally known approaches including, for example, word2vec.

The sequence predictor module 206 can be configured to obtain sequences of features from the corpus. For each feature in an obtained sequence, the sequence predictor module 206 can consult the embedding lookup module 204 to determine an embedding for that feature. With respect to an obtained sequence, the sequence predictor module 206 can provide a respective embedding for each feature of the sequence to a machine learning model (e.g., neural network). An embedding determined for a final feature (e.g., a feature to be predicted by the machine learning model) of the sequence can be provided to the machine learning model as a dependent variable (e.g., supervisory signal). The embeddings determined for other features of the sequence can be provided to the machine learning model as independent variables corresponding to the dependent variable. In some embodiments, as part of a training process, the machine learning model can learn to predict a final feature of a given sequence from the other features of the sequence. Further, as part of the training process, the machine learning model can attempt to improve its prediction accuracy. For example, the machine learning model may adjust both neural network weights and also embeddings generated by the embedding lookup module 204. As an example, the embedding lookup module 204 can make post-training embeddings available to modules of the sustained knowledge module 102. In some implementations, the post-training embeddings can be stored as or in a lookup table which lists for each unique feature of the corpus a corresponding post-training embedding.

Figure 3:
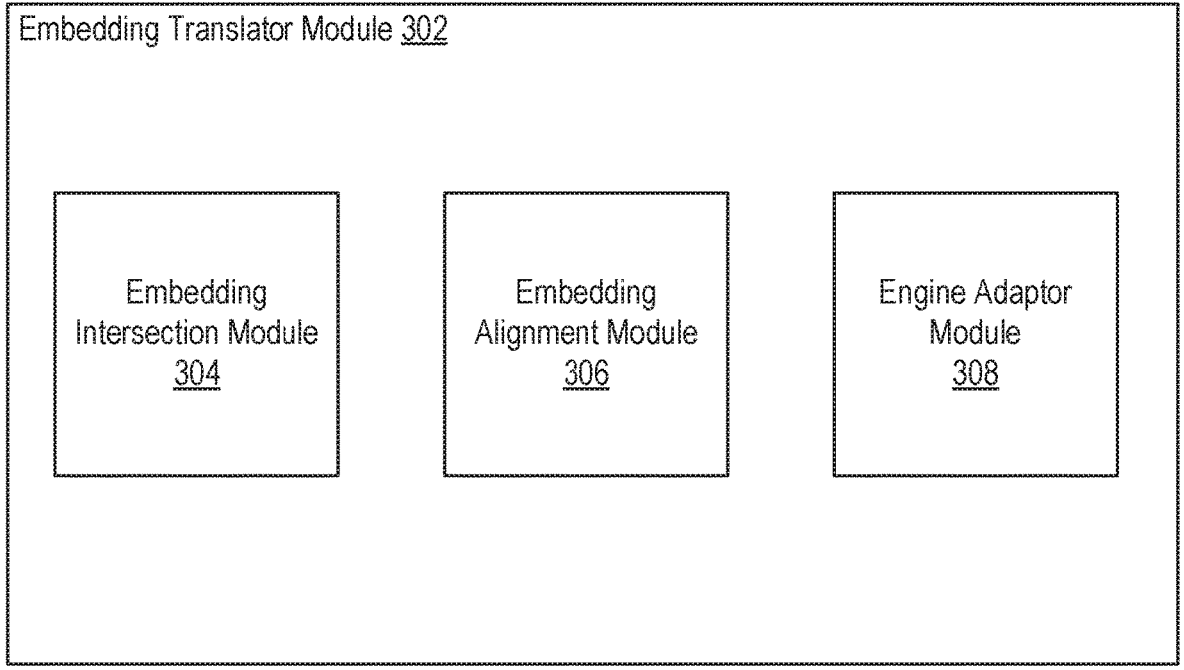
FIG. 3 illustrates an example of an embedding translator module, according to an embodiment of the present disclosure.

FIG. 3 illustrates an example embedding translator module 302, according to an embodiment of the present disclosure. In some embodiments, the embedding translator module 106 of FIG. 1 can be implemented as the example embedding translator module 302. As shown in FIG. 3, the embedding translator module 302 can include an embedding intersection module 304, an embedding alignment module 306, and an engine adaptor module 308.

The embedding translator module 302 can be configured to translate a first type of embedding generated from a first corpus to a second type of embedding generated from a second corpus. The second corpus may be a revised version of the first corpus. For example, the first corpus may include features describing a log of user interactions (e.g., identifiers of pages fanned by users). In this example, the second corpus may include updated features describing user interactions (e.g., additional or different identifiers of pages fanned by users). In this example, a feature corresponding to a user interaction that is common to both corpuses (e.g., unrevised corpus and revised corpus) can map to an embedding of the first type when generated from features in the first corpus and to an embedding of the second type when generated from features in the second corpus. As mentioned, the embeddings can differ due to the two corpuses having different latent spaces. The translated embeddings can be used for various purposes, as described above.

The embedding intersection module 304 can be configured to access the first corpus and the second corpus. The embedding intersection module 304 can determine one or more features which are common to both the first corpus and to the second corpus. As one example, the embedding intersection module 304 can determine the common features by performing an intersection operation with respect to the features of the first corpus and the features of the second corpus. The embedding intersection module 304 can subsequently employ the embedding creation module 104 to create a respective embedding of the first type for each of the common features. Similarly, the embedding intersection module 304 can employ the embedding creation module 104 to create a respective embedding of the second type for each of the common features. The embedding intersection module 304 can then provide the created embeddings of the first type and the created embeddings of the second type to the embedding alignment module 306.

The embedding alignment module 306 can be configured to use the embeddings of the first type and the embeddings of the second type to train a machine learning model. As one example, the machine learning model can employ a non-linear neural network or other neural network. In some embodiments, this model can be trained to translate one type of embeddings (e.g., embeddings of the second type) to another type of embeddings (e.g., embeddings of the first type). For example, the training can include providing embeddings of the second type to the machine learning model as independent variables (or inputs). In such embodiments, the training can further include providing embeddings of the first type to the machine learning model as dependent variables (or outputs). Once trained, the machine learning model can receive an embedding of the second type as input and can output a corresponding embedding of the first type.

In some embodiments, the machine learning model can be trained differently. For example, the machine learning model can be trained to receive embeddings of the first type, and can output corresponding embeddings of the second type. Once trained, the machine learning model can be run as its inverse. Running as its inverse, the model can receive an embedding of the second type as input, and output a corresponding embedding of the first type. There can be many variations or other possibilities.

In some implementations, the engine adaptor module 308 can be configured to receive embeddings of the second type. The engine adaptor module 308 can subsequently determine corresponding, translated embeddings of the first type based on the trained model. The engine adaptor module 308 can then provide the corresponding, translated embeddings of the first type to a recommendation module (e.g., the recommendation module 110 of FIG. 1) to generate insights, as described above. In some embodiments, the engine adaptor module 308 can be configured to receive pooled embeddings of a second type. In such embodiments, the engine adaptor module 308 can determine corresponding, translated pooled embeddings of the first type.

In some embodiments, the engine adaptor module 308 can store mapping information that identifies correlations between embeddings of one type to embeddings of another type. For example, the engine adaptor module 308 can create a lookup table that maps embeddings of the second type to embeddings of the first type. In this example, the lookup table can be used to translate an embedding of the second type to an embedding of the first type.

In some embodiments, the engine adaptor module 308 can translate embeddings from one type to another type as part of an on-the-fly operation. For example, the engine adaptor module 308 can provide the embedding of the second type to the machine learning model of the embedding translator module 302. In response, the engine adaptor module 308 can receive from the machine learning model the corresponding, translated embedding of the first type.

Figure 4:
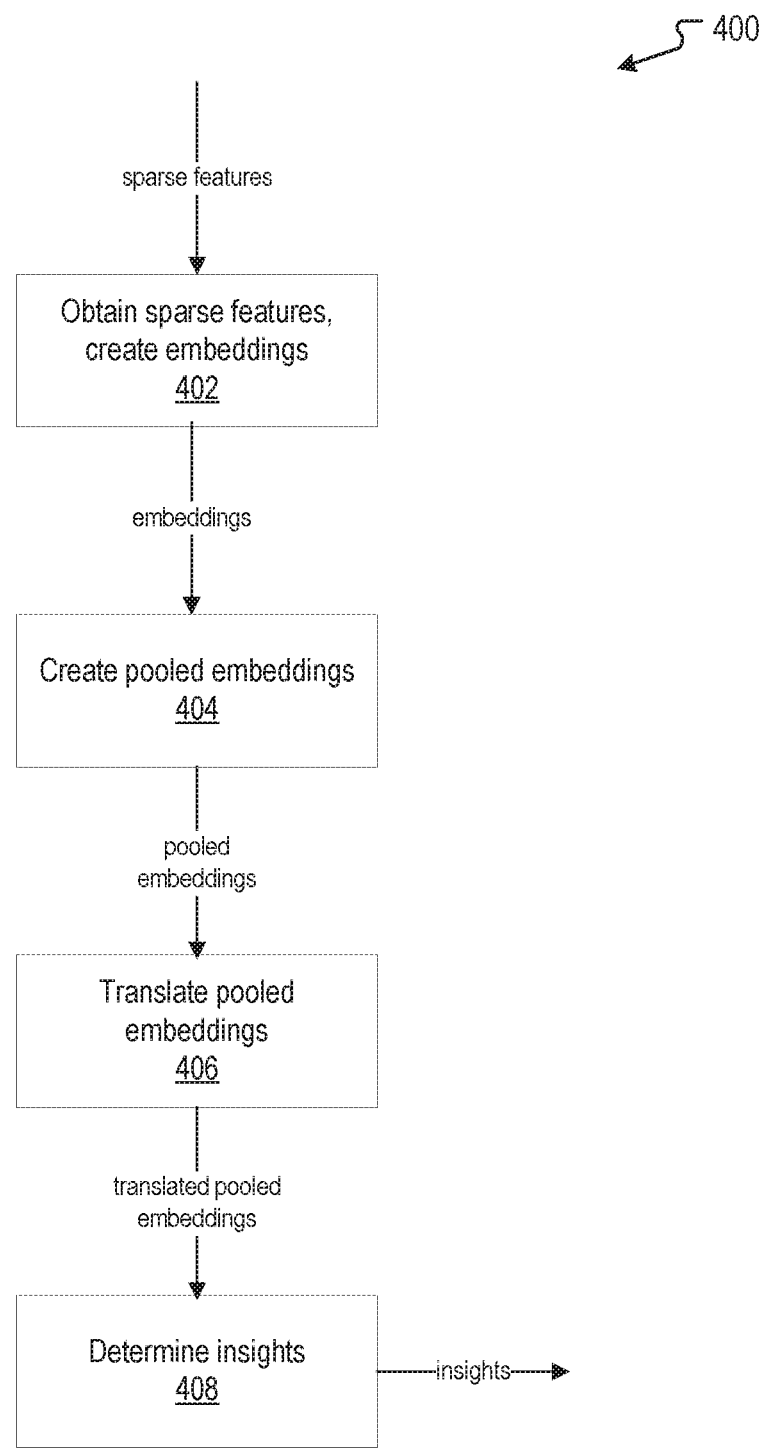
FIG. 4 illustrates an example functional block diagram, according to an embodiment of the present disclosure.

FIG. 4 illustrates an example functional block diagram 400, according to an embodiment of the present disclosure. The example of FIG. 4 illustrates a sequence which includes producing embeddings (e.g., individual embeddings, pooled embeddings) of a second type and translating the embeddings of the second type into corresponding embeddings of a first type.

At block 402, one or more sparse features can be obtained. As one example, the sparse features can be features which can be readily encoded one-hot. As another example, the sparse features can be features which, if encoded multi-hot, would be encoded as vectors which contained mostly zeros. Further, embeddings of the second type can be created from the sparse features. At block 404, one or more pooled embeddings of the second type can be created from the embeddings of the second type. At block 406, the pooled embeddings of the second type can be translated into corresponding pooled embeddings of the first type, as described above. At block 408, one or more insights can be determined. For example, such insights may be determined using a recommendation module (e.g., the recommendation module 110 of FIG. 1), as described above.

FIG. 5 illustrates an example process 500, according to various embodiments of the present disclosure. It should be appreciated that there can be additional, fewer, or alternative steps performed in similar or alternative orders, or in parallel, within the scope of the various embodiments discussed herein unless otherwise stated.

At block 502, the example process 500 can train a machine learning model based on a training set of embeddings of a first type and a training set of embeddings of a second type. For example, the machine learning model can be trained to receive an embedding of a second type and to output a corresponding embedding of the first type. At block 504, a given embedding of the second type can be provided as input to the machine learning model. At block 506, an embedding of the first type can be obtained from the machine learning model. This embedding of the first type corresponds to the given embedding of the second type.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
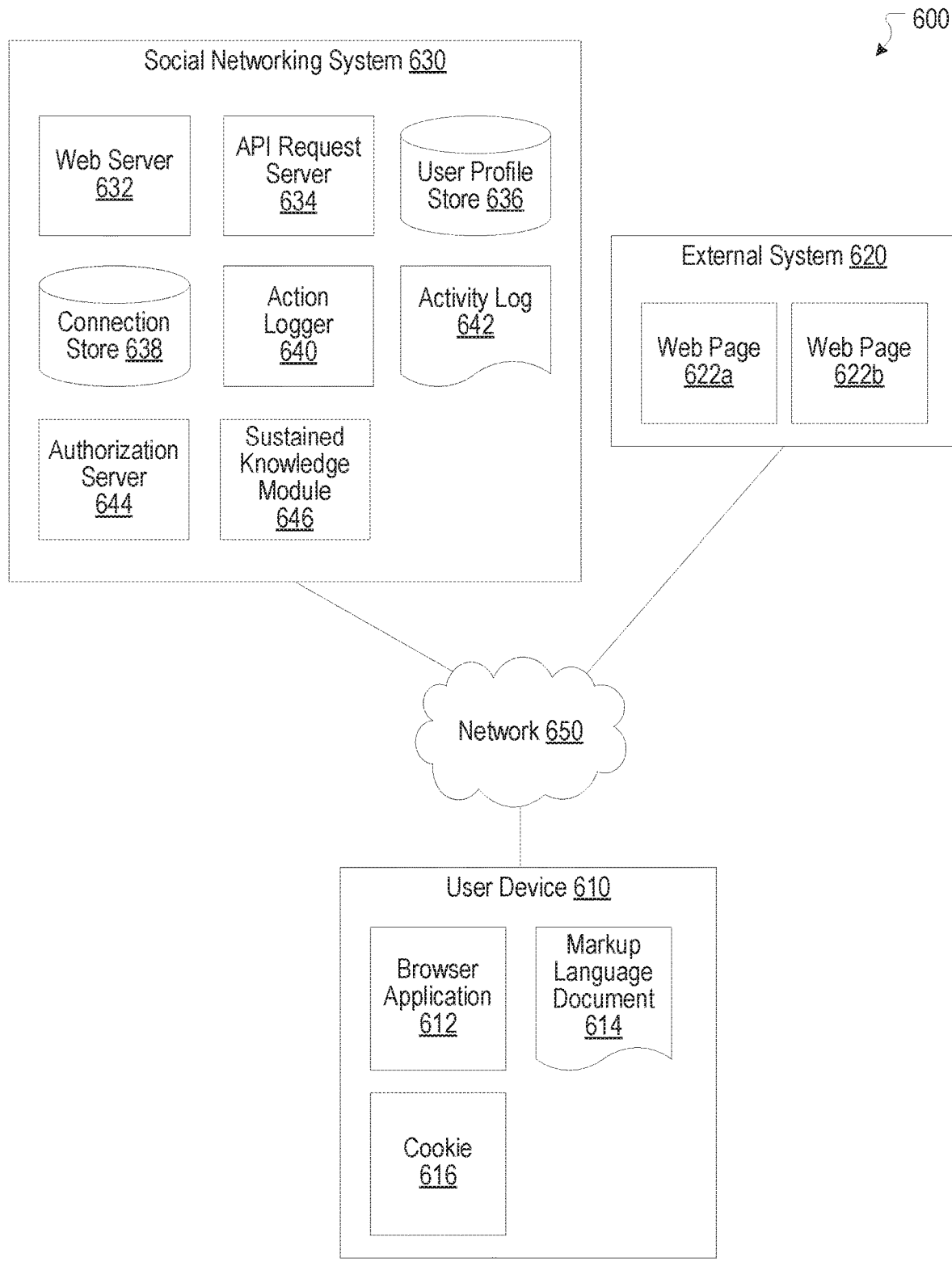
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), macOS, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects another user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a sustained knowledge module 646. The sustained knowledge module 646 can, for example, be implemented as the sustained knowledge module 102 of FIG. 1. As discussed previously, it should be appreciated that there can be many variations or other possibilities.

Hardware Implementation

Figure 7:
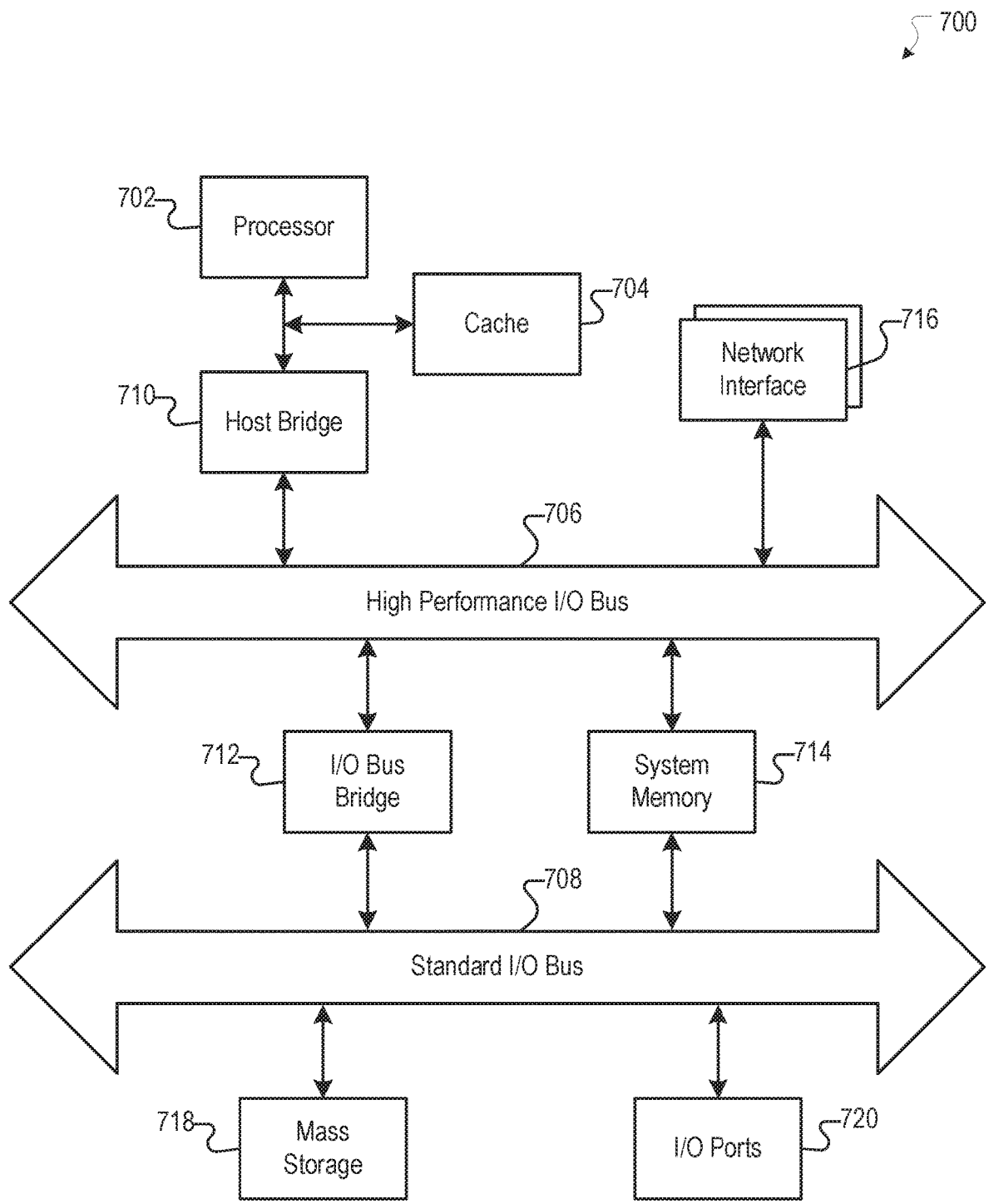
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   generating, by a computing system, a second corpus from a first corpus comprising page features that describe pages, wherein the generating is based on an addition of a new feature to the first corpus or a removal of at least one of the features from the first corpus;
   training, by the computing system, a first machine learning model based on a training set of embeddings of a first type and a training set of embeddings of a second type, wherein the training set of embeddings of the first type is generated from the first corpus and the training set of embeddings of the second type is generated from the second corpus, the first corpus and the second corpus include a common feature, a training embedding of the first type for the common feature is different from a training embedding of the second type for the common feature, and the first machine learning model is trained to receive an embedding of a second type and to output a corresponding embedding of the first type;
   generating, by the computing system, an embedding of the second type based on the new feature;
   generating, by the computing system, a lookup table that stores a mapping of the new feature to the embedding of the second type;
   storing, by the computing system, mappings of embeddings of the first type outputted by the first machine learning model to embeddings of the second type received by the first machine learning model in the lookup table;

determining, by the computing system, a given embedding of the second type as input, wherein the given embedding is based on features associated with a user;

determining, by the computing system, an embedding of the first type based on the lookup table, wherein the embedding of the first type corresponds to the given embedding of the second type; and generating, by the computing system, a recommendation for the user associated with the given embedding of the second type based on a second machine learning model, wherein the second machine learning model receives the embedding of the first type that corresponds to the given embedding of the second type.

2. The computer-implemented method of claim 1, further comprising:

determining, by the computing system, the common feature based on an intersection operation.

3. The computer-implemented method of claim 2, further comprising:

generating a first common embedding of the first type based on the common feature; and generating a second common embedding of the second type based on the common feature.

4. The computer-implemented method of claim 1, further comprising:

running, by the computing system, the first machine learning model as its inverse.

5. The computer-implemented method of claim 1, wherein the first corpus includes user features of users that interact with the pages over a period of time.

6. The computer-implemented method of claim 1, further comprising:

employing, by the computing system, a third machine learning model in creating the training set of embeddings of the first type; and employing, by the computing system, a fourth machine learning model in creating the training set of embeddings of the second type.

7. The computer-implemented method of claim 1, further comprising:

providing, by the computing system, the embedding of the first type to the second machine learning model, wherein the second machine learning model was trained using one or more embeddings of the first type.

8. The computer-implemented method of claim 7, wherein the second machine learning model provides one or more insights using the embedding of the first type.

9. The computer-implemented method of claim 1, wherein the computing device employs on-the-fly translation in obtaining the embedding of the first type.

10. The computer-implemented method of claim 1, further comprising:

storing, by the computing system, in the lookup table, the embedding of the first type.

11. A system comprising:

at least one processor; and a memory storing instructions that, when executed by the at least one processor, cause the system to perform:

generating a second corpus from a first corpus comprising page features that describe pages, wherein the generating is based on an addition of a new feature to the first corpus or a removal of at least one of the features from the first corpus;

training a first machine learning model based on a training set of embeddings of a first type and a training set of embeddings of a second type, wherein the training set of embeddings of the first type is generated from the first corpus and the training set of embeddings of the second type is generated from the second corpus, the first corpus and the second corpus include a common feature, a training embedding of the first type for the common feature is different from a training embedding of the second type for the common feature, and the first machine learning model is trained to receive an embedding of a second type and to output a corresponding embedding of the first type;

generating an embedding of the second type based on the new feature;

generating a lookup table that stores a mapping of the new feature to the embedding of the second type;

storing mappings of embeddings of the first type outputted by the first machine learning model to embeddings of the second type received by the first machine learning model in the lookup table;

determining a given embedding of the second type as input, wherein the given embedding is based on features associated with a user; and determining an embedding of the first type based on the lookup table, wherein the embedding of the first type corresponds to the given embedding of the second type; and generating a recommendation for the user associated with the given embedding of the second type based on a second machine learning model, wherein the second machine learning model receives the embedding of the first type that corresponds to the given embedding of the second type.

12. The system of claim 11, further comprising:

determining the common feature based on an intersection operation.

13. The system of claim 11, further comprising:

running the first machine learning model as its inverse.

14. The system of claim 11, wherein the first corpus includes user features of users that interact with the pages over a period of time.

15. The system of claim 11, further comprising:

providing the embedding of the first type to the second machine learning model, wherein the second machine learning model was trained using one or more embeddings of the first type.

16. A non-transitory computer-readable storage medium including instructions that, when executed by at least one processor of a computing system, cause the computing system to perform:

generating a second corpus from a first corpus comprising page features that describe pages, wherein the generating is based on an addition of a new feature to the first corpus or a removal of at least one of the features from the first corpus;

training a first machine learning model based on a training set of embeddings of a first type and a training set of embeddings of a second type, wherein the training set of embeddings of the first type is generated from the first corpus and the training set of embeddings of the second type is generated from the second corpus, the first corpus and the second corpus include a common feature, a training embedding of the first type for the common feature is different from a training embedding of the second type for the common feature, and the first machine learning model is trained to receive an embedding of a second type and to output a corresponding embedding of the first type;

generating an embedding of the second type based on the new feature;

generating a lookup table that stores a mapping of the new feature to the embedding of the second type;

storing mappings of embeddings of the first type outputted by the first machine learning model to embeddings of the second type received by the first machine learning model in the lookup table;

determining a given embedding of the second type as input, wherein the given embedding is based on features associated with a user;

determining an embedding of the first type based on the lookup table, wherein the embedding of the first type corresponds to the given embedding of the second type; and generating a recommendation for the user associated with the given embedding of the second type based on a second machine learning model, wherein the second machine learning model receives the embedding of the first type that corresponds to the given embedding of the second type.

17. The non-transitory computer-readable storage medium of claim 16, further comprising:

determining the common feature based on an intersection operation.

18. The non-transitory computer-readable storage medium of claim 16, further comprising:

running the first machine learning model as its inverse.

19. The non-transitory computer-readable storage medium of claim 16, wherein the first corpus includes user features of users that interact with the pages over a period of time.

20. The non-transitory computer-readable storage medium of claim 16, further comprising:

providing the embedding of the first type to the second machine learning model, wherein the second machine learning model was trained using one or more embeddings of the first type.

\* \* \* \* \*